US007524241B2

(12) United States Patent
Markert

(10) Patent No.: US 7,524,241 B2
(45) Date of Patent: Apr. 28, 2009

(54) DEVICE AND METHOD FOR CUTTING MEAT

(75) Inventor: Georg Hendrik Markert, Otterlo (NL)

(73) Assignee: Equimex Holdings, B.V., Otterlo (NL)

( * ) Notice: Subject to any disclaimer, the term of this patent is extended or adjusted under 35 U.S.C. 154(b) by 569 days.

(21) Appl. No.: 10/485,630

(22) PCT Filed: Oct. 10, 2002

(86) PCT No.: PCT/NL02/00645

§ 371 (c)(1),
(2), (4) Date: Apr. 5, 2004

(87) PCT Pub. No.: WO03/031127

PCT Pub. Date: Apr. 17, 2003

(65) Prior Publication Data

US 2004/0192183 A1 Sep. 30, 2004

(30) Foreign Application Priority Data

Oct. 11, 2001 (NL) .................................... 1019613

(51) Int. Cl.
*A22C 18/00* (2006.01)

(52) U.S. Cl. ...................................................... 452/149

(58) Field of Classification Search ................. 452/149, 452/151, 155, 160, 171, 182; *A22C 17/02*
See application file for complete search history.

(56) References Cited

U.S. PATENT DOCUMENTS 1,817,678 A 8/1931 Dunseth
2,173,336 A * 9/1939 Lamere et al. .............. 452/127
2,744,285 A * 5/1956 Christiansen ............... 452/127
3,561,044 A 2/1971 Evich
4,557,014 A * 12/1985 Vogt ........................... 452/151
5,037,349 A 8/1991 Perreault
5,230,267 A 7/1993 Abler
5,295,896 A 3/1994 Petersen
5,320,575 A * 6/1994 Fukamoto ...................... 452/1

(Continued)

FOREIGN PATENT DOCUMENTS

DE 9415688 11/1994

(Continued)

OTHER PUBLICATIONS

IPER; Jan. 20, 2004; 19 pages.

(Continued)

*Primary Examiner*—Thomas Price
(74) *Attorney, Agent, or Firm*—Gardner Groff Greenwald & Villanueva, PC

(57) ABSTRACT

A device (1) for cutting meat, provided with at least one knife (12) and means (2,3) for carrying, in a transport direction (T), meat (22) along the knife (12), such that the meat is cut into at least two parts, while in the transport direction (T) directly behind the at least one knife (12), a separating plate (15) is arranged, the arrangement being such that during use, a first part of the cut meat is guided to a first side (16) of the separating plate and a second part of the cut meat is guided along the opposite second side of the separating plate and the parts of the meat are processed separately from each other.

19 Claims, 3 Drawing Sheets

U.S. PATENT DOCUMENTS

| | | | | | |
|---|---|---|---|---|---|
| 5,370,573 | A | * | 12/1994 | Warren et al. | 452/149 |
| 5,466,186 | A | * | 11/1995 | Hjorth | 452/170 |
| 5,738,577 | A | * | 4/1998 | Long | 452/127 |
| 6,044,739 | A | | 4/2000 | Abler et al. | |
| 6,117,247 | A | | 9/2000 | Huang | |
| 6,244,950 | B1 | * | 6/2001 | Long et al. | 452/127 |
| 6,712,686 | B2 | * | 3/2004 | Markert et al. | 452/160 |
| 6,716,097 | B2 | | 4/2004 | Freund et al. | |
| 7,096,769 | B2 | | 8/2006 | Biggs et al. | |

FOREIGN PATENT DOCUMENTS

| | | |
|---|---|---|
| FR | 1486165 | 6/1967 |
| FR | 1576628 | 8/1969 |
| FR | 2549409 | 1/1985 |
| FR | 2623470 | 5/1989 |
| GB | 2364894 | 2/2002 |

OTHER PUBLICATIONS

ISR; Feb. 18, 2003; 3 pages.

* cited by examiner

DEVICE AND METHOD FOR CUTTING MEAT

This application is the U.S. National Phase of International Application Number PCT/NL02/00645 filed on 10 Oct. 2002, which is incorporated herein by reference.

BACKGROUND OF THE INVENTION

The invention relates to a device for cutting meat. In particular, the invention relates to a device for cutting meat such that different parts of the meat can be processed separately.

From practice, cutting devices are known for cutting slices of meat, wherein a rotating knife is used, arranged substantially vertically. Meat is forced along this knife by hand, so that relatively thin slices can be cut, which fall at the side of a supporting plate remote from the knife. By repeatedly moving the meat along the knife, a stack of slices is obtained. This device requires much time and labor for obtaining the desired division.

Further, cutting devices are known wherein a knife is provided, extending approximately horizontally, and meat is guided along the knife with the aid of transport means, and is cut into parts. Behind the knife, the upper part of the meat, which is cut loose, falls back onto the underlying part and is taken therefrom by hand for further processing. Such devices are, for instance, used for cutting fillets, cutlets and the like and have as an important drawback that taking away the cut-away parts requires a lot of manual labor and is, therefore, expensive. Moreover, this can easily lead to mistakes. A further drawback of these known devices is that, as the cut-loose meat falls back onto the underlying part, it cannot be taken way in a simple manner. This is in particular not the case with types of meat such as chicken or other poultry, where cut-up cells cause adhesion, for instance through the release of proteins.

FR 2 623 470 discloses a machine and method for cutting strips of meat, using a horizontal knife and a separating plate directly behind said knife for guiding a top part of the cut meat along an upper path different from the rest of said meat which falls down freely. Said upper path is defined by a belt. The meat is forced past the said knife by a toothed wheel and a guide element extending above said wheel. On the upper path the cut part lies free on said belt.

The object of the invention is a cutting device for meat, wherein the drawbacks mentioned of the known devices are avoided while maintaining their advantages.

SUMMARY OF THE INVENTION

In particular, the object of the invention is a cutting device for meat, wherein, with relatively little effort and a relatively small risk of mistakes, meat can be cut in different, in particular at least two, parts which can be separated from each other in a simple manner for further, separate processing.

More in particular, the object of the invention is a device for cutting fillets, cutlets and the like, in particular poultry.

A device according to the invention is characterized by the features of claim 1.

With a device according to the invention, meat is cut with a knife and, immediately behind it, discharged along a separating plate. As a result, in a simple manner, the cut-loose parts are prevented from falling back onto each other while, moreover, the cut-loose parts are separated from each other and are discharged for separate processing. To this end, manpower is no longer required, which is advantageous from an economic and technical point of view. Furthermore, the safety is therefore enhanced as users need no longer work in the vicinity of the knives. As a further result, the accuracy is enhanced.

As, in a device according to the invention, a conveyor belt extends along at least one part of the separating plate, a cut-off part of the meat guided by the separating plate can, during use, simply be discharged along the separating plate, also when gravity is not sufficient to that end. Moreover, thus, guided discharge is obtained, so that the meat can be moved at the desired speed and mutual positions. It is then preferred that also a conveyor belt is provided before the knife in transport direction, while, in a particularly advantageous embodiment, the two conveyor belts are either virtually contiguous to each other at the location of the knife, or are designed as one continuous conveyor belt. Consequently, what is thus obtained, is that along the entire path, the meat is forced forward. A supporting surface for guiding the meat can be provided, which supporting face can be designed as a further conveyor belt. It is then preferred that, during use, the meat is somewhat compressed between the supporting face and the or each conveyor belt, so that an even better transport is obtained.

In a further elaboration, a device according to the invention is further characterized by the features of claim 2.

A knife, extending substantially horizontally, approximately contiguous to a separating plate, offers the advantage that the meat can be supplied and be taken along the knife in a simple manner, while the cut parts can be separated from each other in a simple manner. As a horizontal knife, both a stationary and a moving knife can be used, while, herein, knife is also understood to mean band or belt saws or knives, cutting wires, circular knives combinations thereof and the like.

Viewed in transport direction, different knives can be provided behind one another or above one another, while to at least a number of the knives, a separating plate is contiguous for discharging different parts of the meat. As a result, meat can be cut in more than two parts in a simple manner.

It is particularly advantageous when, during use, the or each knife is moistened, for instance with water. As a result, after being cut loose, the meat is prevented even better from adhering to other parts of the meat and/or the or each knife.

The invention further relates to a method for cutting meat, characterized by the features of claim 10.

BRIEF DESCRIPTION OF THE DRAWINGS

With such a method, which can particularly advantageously be used with a device according to the invention, in a rapid and economical manner, meat can safely be cut into different parts which can be discharged for different processing steps.

In the further subclaims, further advantageous embodiments of a device and method according to the invention are shown.

Figure 1:
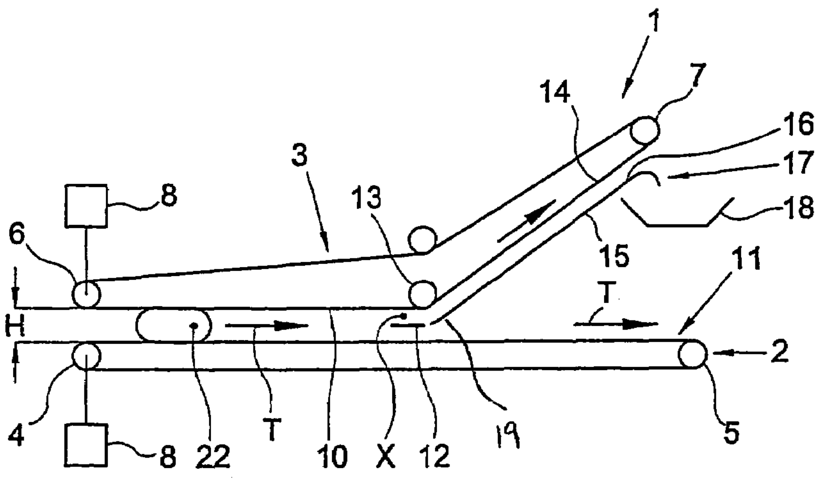
Figure 2:
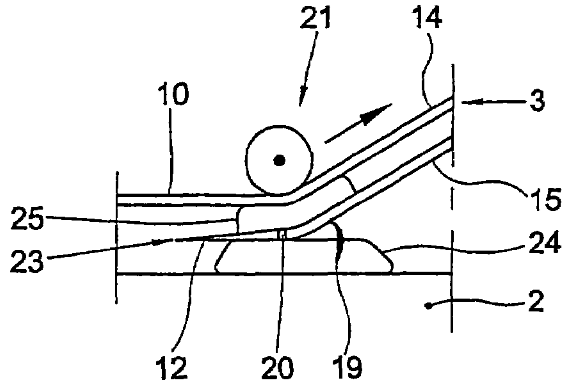
Figure 3:
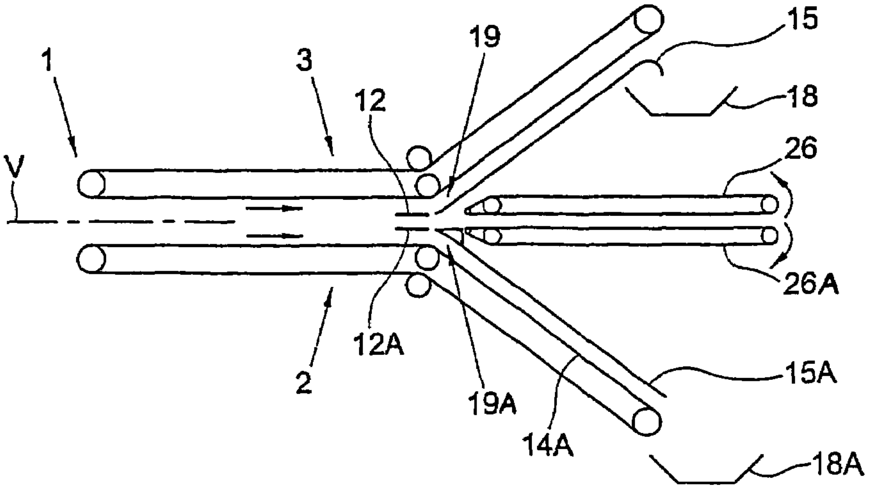
Figure 4:
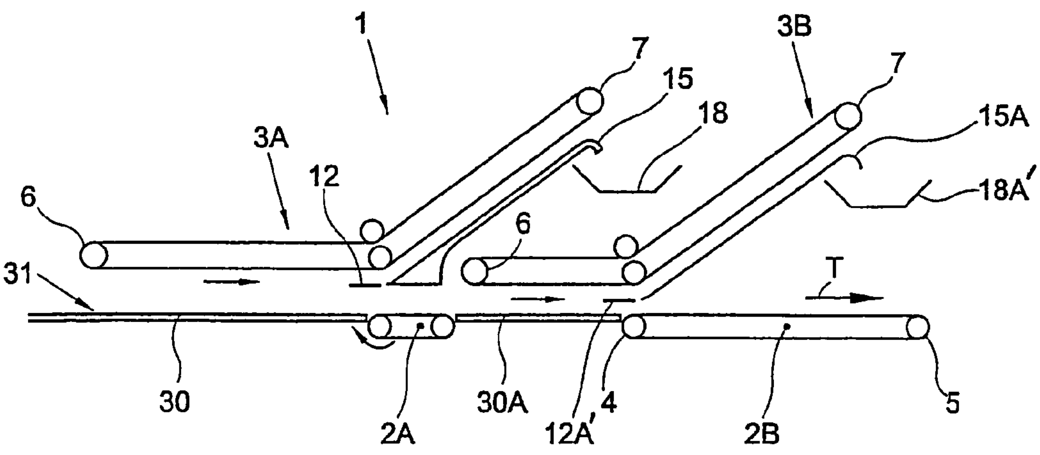
Figure 5:
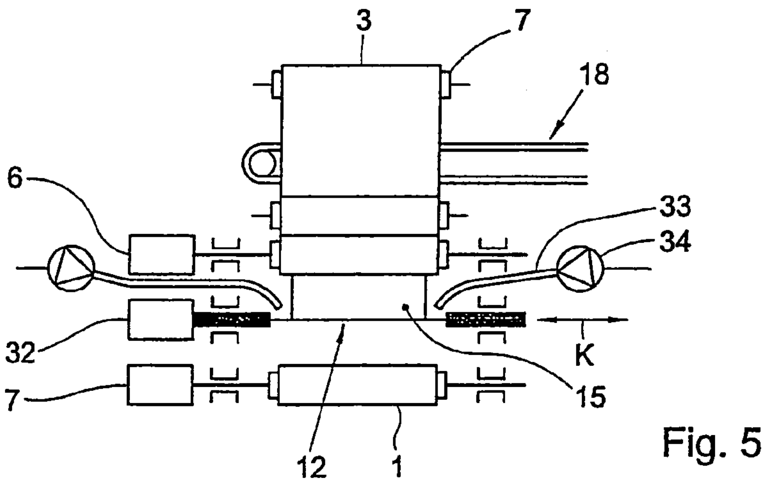
Figure 6:
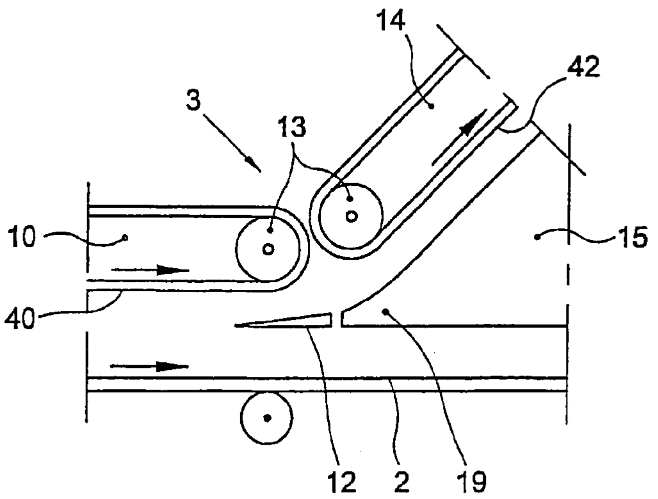
Figure 7:
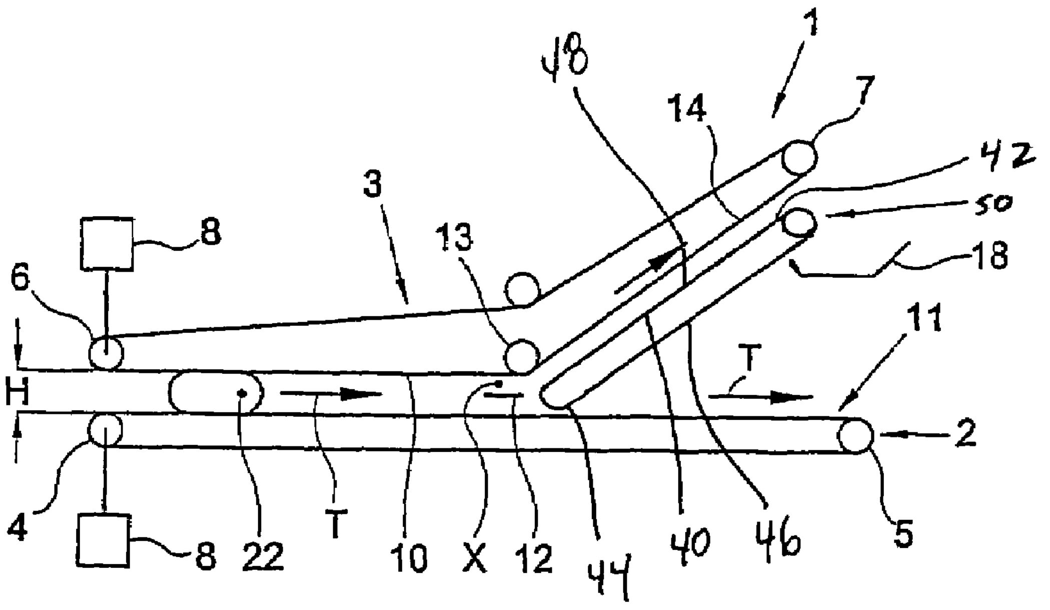

In clarification of the invention, exemplary embodiments of a device and method according to the invention will be further elucidated with reference to the drawing. In the drawing:

FIG. 1 schematically shows, in side view, a device according to the invention, in a first embodiment;

FIG. 2 schematically shows a part of a device according to FIG. 1, in side view;

FIG. 3 schematically shows a device according to the invention in a first alternative embodiment, in side view;

FIG. 4 schematically shows a second alternative embodiment of a device according to the invention, in side view;

FIG. 5 shows, in front view, schematically, a device according to the invention;

FIG. 6 schematically shows a part of a device according to the invention, comparable to FIG. 2, in a further alternative; and FIG. 7 schematically shows a further alternative embodiment of the device according to the invention using a separating conveyer belt, in side view.

DETAILED DESCRIPTION OF THE INVENTION

In this description, identical or corresponding parts have identical or corresponding reference numerals.

In this description, each time, the starting point is a device and method for cutting meat while fillet is used as an example. It will be clear that any sort of meat can be cut with it.

FIG. 1 schematically shows, in side view, a device 1 according to the invention, in a first embodiment, comprising a first conveyor belt 2 extending approximately horizontally, and a second conveyor belt 3, extending thereabove, having an angled course to be described hereinafter. The conveyor belts 2, 3 are guided along end rollers 4 and 5, 6 and 7, respectively, and are endless. The rollers 4, 6 are driven by schematically shown motors 8, which motors have been omitted in the further Figures, with the exception of FIG. 5. Suitable transmissions can be used for driving the two conveyor belts 2, 3 at a suitable, optionally variable, speed. Preferably, drum motors are used in the rollers.

The second conveyor belt 3 comprises a first conveying part 10 extending approximately parallel to and at a relatively short distance H above the conveying part of the first conveyor belt 2. Near the end of the first conveying part 10 mentioned, leading in transport direction T, between the two conveyor belts 2, 3, a knife 12 is provided, extending approximately horizontally, for instance a rotating or a translating knife. Above the knife 12, a guiding roller or plate 13 is provided along which the second conveyor belt 3 is guided, such that a second conveying part 14 thereof extends at an inclination in the direction of the end roller 7. The inclination is selected such that the distance between the guiding roller 13 and the first conveyor belt 2 is smaller than the distance between the end rollers 5 and 7. The distance X between the knife 12 and the upper conveyor belt 3 is smaller than the distance H.

A separating plate 15 has a guiding surface 16 extending approximately parallel to the second conveying part 14 of the second conveyor belt 3, at a distance which approximately corresponds to the distance X, from immediately behind the knife 12 to, for instance, approximately under the end roller 7. Under the end 17 forward in the transport direction T of the separating plate 15, discharge means 18 are situated, for instance a conveying tray or belt which extends, for example, approximately transversely to the transport direction T. The end 19 of the separating plate 15 located immediately behind the knife 12 is contiguous to the knife 12 to such an extent that the knife can make the desired cutting movement but that only a minimum space 20 between the knife 12 and the end 19 of the separating plate 15 is provided. Meat is thus prevented from passing through the space 20 mentioned. In FIG. 2, in enlargement, the transition 21 between the knife 12 and the separating plate 15, as well as between the first conveying part 10 and the second conveying part 14 of the second conveyor belt 3, is represented.

In FIG. 1, between the first conveying part 10 and the first conveyor belt 2, a piece of meat such as a chicken breast 22 is shown, which has been compressed slightly. The thickness of the meat 22 is somewhat greater than the distance H between the two conveyor belts 2, 3. With the aid of the conveyor belts 2, 3, the meat 22 is forced in the transport direction T to a point beyond the knife 12. The conveying force of the conveyor belts 2, 3 is sufficient to urge the meat over the blade or cutting edge 23 of the knife 12, so that it is cut into a lower part 24 and an upper part 25, as shown in FIG. 2. The lower part 24 is carried along by the first conveyor belt 2 in the transport direction T to be processed further, while the upper part 25 is forced over the top of the knife 12 onto the separating plate 15, over which it is forced by the second conveying part 14 beyond the end 17 and into or onto the discharge means 18, to be processed further in a different manner. Preferably, the distance X is adjustable, as is the distance between the conveyor belts, and the conveyor belt and the separating plate, respectively, so that meat can be cut to any desired thickness, into parts 24, 25 of the same or different thickness. By way of illustration, the lower part 24 can, for instance, be further processed into chicken cutlet or the like, while the upper part 25 can, for instance, be processed into chicken nuggets, satay or the like. Naturally, this should not be taken to be limitative in any way.

In FIG. 3, a first alternative embodiment of a device 1 according to the invention is shown, while the second conveyor belt 3 is designed as shown in FIG. 1, as is the knife 12 and the (first) separating plate 15 and the (first) discharge means 18. However, in this embodiment, the first conveyor belt 2 is designed as the second conveyor belt, yet mirrored relative to a horizontal plane V between the two conveyor belts, 2, 3. As a result, the first conveyor belt 2 has a sloping second conveying part 14*a*, terminating above second discharge means 18*a*. A second separating plate 15*a* is provided above the sloping part 14*a* mentioned. In front of the end 19 of the second separating plate 15*a*, rearward in transport direction, a second knife 12*a* is provided, approximately parallel to the knife 12. Behind the knives 12, 12*a* and the ends 19, 19*a* of the two separating plates 15, 15*a*, two third conveyor belts 26, 26*a* are provided, extending approximately parallel to each other, at a mutual distance which is approximately equal to the distance between the two knives 12, 12*a*. With such a device, meat can be cut into three parts, an upper part being carried into the first discharge means 18 by the first separating plate 15, a lower part being carried along the second separating plate 15*a* into the second discharge means 18*a*, and a middle part of the meat being discharged between the third conveyor belts 26, 26*a* for separate processing.

It will be clear that in a comparable manner also more than two knives 12, 12*a* can be arranged one above the other, with associated conveying parts and separating plates, for separating the meat into more than three parts.

In FIG. 4, a further alternative embodiment of a device 1 according to the invention is shown, where, broadly speaking, it can be stated that two devices as shown in FIG. 1 are arranged one behind the other. In this device, a first conveying surface 31 is provided, formed by, viewed in transport direction, successively, a guiding plane 30, a primary first conveyor belt 2*a*, a second guiding plane 30*a* and a secondary first conveyor belt 2*b*. Meat can be moved over this in a substantially horizontal transport direction T. Above this transport plane 31, a primary second conveyor belt 3*a* is provided, as well as a secondary conveyor belt 3*b* arranged behind it. A primary knife 12 is arranged approximately above the transition between the first guiding plane 30 and the primary first conveyor belt 2*a*, while the secondary knife 12*a'* is arranged approximately above the transition between the second guiding plane 30*a* and the secondary first conveyor belt 2*b*.

With a device according to FIG. 4, meat can be conveyed by the primary second conveyor belt 3*a* in the direction of and along the primary knife 12, so that it is separated into an upper part and a lower part. The upper part is discharged along the primary separating plate 15 to the discharge means 18, while the lower part is moved further by the primary first conveyor belt 2*a* to the secondary second conveyor belt 3*b*. The lower part of the meat is guided thereby along the secondary knife 12*a*', where it is cut into a second upper part and second lower part. With the aid of the secondary separating plate 15*a*, the second upper part is discharged to the second discharge means 18*a*', while the second lower part is discharged by the secondary first conveyor belt 2*b* for separate processing. It will be clear that in a comparable manner, also more than two knives with associated separating plates and discharge means can be arranged one behind the other. Also, combinations of the embodiments according to FIGS. 3 and 4 can be used, while knives are arranged both behind and above each other. Naturally, the guiding planes 30, 30*a* can also be designed as conveyor belts, as can the separating plates 15.

In FIG. 5, in front view, a device according to the invention is shown, for instance one as shown in FIG. 1. The discharge device 18, designed as conveyor belt is clearly visible. In this embodiment, the knife 12 is designed as a translating knife horizontally reciprocating in the direction K, driven by driving means 32 suitable to that end and known per se. Above the knife 12, sprinklers 33 are provided, through which, with the aid of a pump 34, water or a different agent can be fed with which the meat can be prevented from clinging to the knife 12 and/or another part of the meat, after it has been cut. This is particularly important with meat from which, upon cutting through the cells, sticky substances are released such as collagen. It will be clear that also, in a simple manner, other knives can be utilized, for instance continuously running knives such as band knives, cutting wires or the like, or rotating knives, while also a lubricating liquid can be supplied, counteracting the adhesion.

FIG. 6 shows, somewhat enlarged, a further alternative embodiment of a part of a device according to the invention, while the second conveyor belt 3 is subdivided into a first part 10 and a second part 14. The first part 10 is formed by a primary conveyor belt 40, the second part 14 by a secondary conveyor belt 42. The first conveyor belt 2 is a continuous belt. Two rollers 13 are provided at a relatively short distance from each other above the knife 12.

FIG. 7 shows a further alternative embodiment of the device according to the invention with similar parts of as the device as shown in FIG. 1 labeled with identical reference numbers. In this embodiment the original separating plate 15 has been replaced with a separating conveyor belt 40. The separating conveyor belt 40 has a guiding surface 42 extending approximately parallel to the second conveying part 14 of the second conveyor belt 3, at a distance which approximately corresponds to the distance X. The separating conveyor belt 40 extends immediately behind the knife 12 to approximately under the roller 7. Under the end 50 forward in the transport direction T of the separating conveyor belt 40 a discharge means 18 is situated for moving the food. The end 44 of the separating conveyor belt 40 is located immediately behind the knife 12 and is contiguous to the knife 12 to such an extent that the knife 12 can make the desired cutting movement that only a minimum space 20 between the knife 12 and the end 44 of the separating conveyor belt 40 is provided. Thus, meat is prevented from passing through the space 20. The separating conveyor belt 40 has a first side 46 which is the lower side of the separating conveyor belt 40. The separating conveyor belt 40 also has an opposite inclined portion 48 where the food item is transported along and is preferably an inclined portion 48 that follows the second conveying portion 14 of the second conveyor belt 3. The separating plate 15 is designed as a block with a somewhat triangular end 19, arranged such that an upper part of the meat cut by the knife can be discharged along the upper part thereof with the aid of the secondary conveyor belt 42, while the lower part can be discharged below it with the aid of the first conveyor belt 2.

It will be clear that for the exemplary embodiments shown in this drawing it holds that a number of such devices can be arranged next to each other for cutting different pieces of meat into different strips, which can link up to the same or different discharge means. Different parts of these devices can de designed so as to be easily disassembled or removed for simple maintenance, cleaning and the like. The different parts are adjustable, so that different sorts and thicknesses of meat can be cut in different ratios, depending on the wishes of the user.

In a further alternative embodiment, the or each knife is arranged at an angle, for instance approximately vertical. This is achieved by rotating a device according to one of the Figures over an angle, for instance around an axis parallel to the transport direction or around an axis extending at right angles thereto. The FIGS. 1-4 and 6 can, for instance, be seen as a top plan view of such a device. The conveyor belts can incline in the transport direction.

The invention is not limited in any manner to the exemplary embodiments represented in the description and the drawing. Many variations thereon are possible in the framework of the invention.

For instance, instead of conveyor belts, also other transport means can be utilized, such as conveyor chains, link conveyors and the like. Naturally, the exemplary embodiments shown in FIGS. 1 and 4 can also be utilized "upside down", i.e. with a horizontal upper conveyor belt and a angled lower conveyor belt. A knife of a device according to the invention can also include an angle with the horizontal, for instance for cutting differently shaped pieces of meat. Also, in addition to horizontal knives, further knives can be provided which cut off, for instance, longitudinal edges and which, to that end, include an angle with the horizontal and, for instance, can be set vertically. The separating plates can also be designed as conveyor belts, chains or the like.

It will be clear that a device according to the invention can also be obtained by converting an existing device for cutting meat in two parts, whereby, for instance above an existing first conveyor belt 2, extending approximately horizontally, a second conveyor belt, also horizontally arranged, is replaced with a second conveyor belt 3 according to the invention, while also a separating plate 15 is provided, in the manner shown in, for instance, FIG. 1 or 4. Such a conversion is expressly understood to fall within the framework of the invention as outlined by the claims.

These and many comparable variations are understood to fall within the framework of the invention.

The invention claimed is:

1. A device for cutting meat, comprising:

at least one knife;

first and second transport mechanisms that cooperate to convey the meat along the knife in a transport direction such that the meat is cut into at least first and second cut meat parts; and a stationary separator mounted immediately behind, with respect to the transport direction, the at least one knife, the separator having at least one stationary guiding surface, wherein the stationary guiding surface and the second transport mechanism cooperate to maintain the second cut meat part therebetween under a substantially constant compression and to convey the constant-compression second cut meat part away from the knife separately from the first cut meat part.

2. The device according to claim 1, wherein the knife extends substantially horizontally and at least a portion of the separator extends substantially horizontally and is co-planar with the knife.

3. The device according to claim 1, wherein the first and second transport mechanisms include first and second feeding transport surfaces that are substantially parallel to each other, and the second transport mechanism includes a discharging transport surface that is substantially parallel to the guiding surface of the separator, wherein a distance H between the first and second feeding transport surfaces is adjustable, and wherein a distance X between the discharging transport surface and the separator guiding surface adjustable, such that the distances H and X can be adjusted so that, during use, the meat is compressed between the first and second feeding transport surfaces before cutting and after cutting the second cut meat part is compressed between the discharging surface and the separator guiding surface.

4. The device according to claim 1, wherein the separator has a discharge end opposite the knife, and further comprising a means for discharging at least the second cut meat part, wherein the discharge end of the separator is positioned above the discharging means.

5. The device according to claim 1, further comprising means for moistening the knife with water.

6. The device according to claim 1, wherein the second transport mechanism includes a discharging transport subassembly positioned behind, with respect to the transport direction, the knife, wherein the discharging transport subassembly includes a discharging transport surface that moves, that is substantially parallel to the stationary guiding surface of the stationary separator, and that cooperates with the stationary guiding surface to maintain the second cut meat part therebetween under a substantially constant compression and to convey the constant-compression second cut meat part away from the knife separately from the first cut meat part.

7. The device according to claim 6, wherein the second transport subassembly includes at least one conveyor belt that defines the discharging transport surface.

8. The device according to claim 6, wherein the stationary separator comprises a plate that defines the stationary guiding surface.

9. The device according to claim 6, wherein the first and second transport mechanisms include at least one feeding transport surface, wherein the discharging transport surface and at least a portion of the separator guiding surface are angled with respect to the at least one feeding transport surface.

10. The device according to claim 6, wherein the first and second transport mechanisms include first and second feeding transport subassemblies, respectively, that are positioned in front of, with respect to the transport direction, the knife, wherein the first and second feeding transport subassemblies include first and second feeding transport surfaces, respectively, that are substantially parallel to each other and that cooperate to maintain the meat therebetween under a substantially constant compression and to convey the constant-compression meat into engagement with the knife for cutting into the first and second cut meat parts.

11. The device according to claim 10, wherein the second transport mechanism includes a single conveyor belt that defines the second feeding transport surface and the discharging transport surface.

12. The device according to claim 1, wherein the first and second transport mechanisms include first and second feeding transport subassemblies, respectively, that are positioned in front of, with respect to the transport direction, the knife, wherein the first and second feeding transport subassemblies include first and second feeding transport surfaces, respectively, that cooperate to maintain the meat therebetween under a substantially constant compression and to convey the constant-compression meat into engagement with the knife for cutting into the first and second cut meat parts.

13. The device according to claim 12, wherein the first and second feeding transport surfaces are substantially parallel to each other.

14. The device according to claim 12, wherein the first and second feeding transport subassemblies include at least first and second conveyor belts, respectively, that define the first and second feeding transport surfaces, respectively.

15. A device for cutting meat, comprising:

at least one knife;

first and second transport mechanisms that include first and second feeding transport subassemblies, respectively, that include first and second feeding conveyor belts, respectively, that are substantially parallel to each other and that cooperate to maintain the meat therebetween under a substantially constant compression and convey the constant-compression meat into engagement with the knife in a transport direction such that the meat is cut into at least first and second cut meat parts, the first and second feeding transport subassemblies positioned in front of, with respect to the transport direction, the knife, wherein the second transport mechanism further includes a discharging transport subassembly positioned behind, with respect to the transport direction, the knife, the discharging transport subassembly including a discharging conveyor belt that moves, wherein the first and second transport mechanisms do not include any serrated element that could damage the meat; and a stationary separator mounted immediately behind, with respect to the transport direction, the at least one knife, the separator having at least one stationary guiding surface, wherein the stationary guiding surface and the moving discharging conveyor belt are substantially parallel to each other and cooperate to maintain the second cut meat part therebetween under a substantially constant compression and to convey the constant-compression second cut meat part away from the knife separately from the first cut meat part.

16. The device according to claim 15, wherein the second transport mechanism includes a single conveyor belt, wherein the second feeding conveyor belt is defined by a portion of the single conveyor belt that is in front of, with respect to the transport direction, the knife at a given moment, and the discharging conveyor belt is defined by a portion of the single conveyor belt that is behind, with respect to the transport direction, the knife at that moment.

17. The device according to claim 15, wherein the first transport mechanism includes a discharging conveyor belt that conveys the first cut meat part away from the knife separately from the second cut meat part.

18. A device for culling meat, comprising:

at least one knife;

first and second transport mechanisms that include first and second feeding transport subassemblies, respectively, that include first and second moving feed surfaces, respectively, that are substantially parallel to each other and that cooperate to maintain the meat therebetween under a substantially constant compression and convey the constant-compression meat into engagement with the knife in a transport direction such that the meat is cut into at least first and second cut meat parts, the first and second feeding transport subassemblies positioned in front of, with respect to the transport direction, the knife, wherein the second transport mechanism further includes a discharging transport subassembly positioned behind, with respect to the transport direction, the knife, the discharging transport subassembly including a moving discharge surface; and a separator mounted immediately behind, with respect to the transport direction, the at least one knife, the separator having at least one guide surface, wherein the guide surface and the discharge surface are substantially parallel to each other and cooperate to maintain the second cut meat part therebetween under a substantially constant compression and to convey the constant-compression second cut meat part away from the knife separately from the first cut meat part.

19. The device according to claim 18, wherein the separator and the guide surface are stationary with respect to the moving discharge surface.

* * * * *